US012617274B2

(12) United States Patent
Ukai

(10) Patent No.: US 12,617,274 B2
(45) Date of Patent: May 5, 2026

(54) WORK VEHICLE

(71) Applicant: Kubota Corporation, Osaka (JP)

(72) Inventor: Tomoyuki Ukai, Sakai (JP)

(73) Assignee: Kubota Corporation, Osaka (JP)

( * ) Notice: Subject to any disclaimer, the term of this patent is extended or adjusted under 35 U.S.C. 154(b) by 62 days.

(21) Appl. No.: 18/131,057

(22) Filed: Apr. 5, 2023

(65) Prior Publication Data

US 2023/0322084 A1 Oct. 12, 2023

(30) Foreign Application Priority Data

Apr. 8, 2022 (JP) ................................. 2022-064614

(51) Int. Cl.
| | |
|---|---|
| *B60K 35/10* | (2024.01) |
| *B60K 26/02* | (2006.01) |
| *B60K 31/00* | (2006.01) |
| *B60T 7/04* | (2006.01) |

(52) U.S. Cl.
CPC .............. *B60K 35/10* (2024.01); *B60K 26/02* (2013.01); *B60K 31/00* (2013.01); *B60T 7/04* (2013.01); *B60K 2310/20* (2013.01); *B60K 2700/00* (2013.01)

(58) Field of Classification Search
None
See application file for complete search history.

(56) References Cited

U.S. PATENT DOCUMENTS

| | | | | |
|---|---|---|---|---|
| 3,476,204 A | * | 11/1969 | Bourgeois ............ | B60K 18/178 180/178 |
| 2006/0169549 A1 | * | 8/2006 | Lang ..................... | F16D 55/228 188/73.1 |
| 2012/0055728 A1 | | 3/2012 | Bessho et al. | |

FOREIGN PATENT DOCUMENTS

| | | |
|---|---|---|
| JP | 4931046 | 3/1974 |
| JP | 2125428 | 10/1990 |
| JP | 201251507 A | 3/2012 |

* cited by examiner

*Primary Examiner* — Vicky A Johnson
(74) *Attorney, Agent, or Firm* — The Webb Law Firm

(57) ABSTRACT

A work vehicle includes an output pedal that controls the output of a motive section, a biasing member that biases the output pedal to return, and a brake pedal that operates a travel brake to a braking state. Also included are a holding section operable to a holding state of holding the output pedal at any depressed position and to a release state of releasing the holding of the output pedal, and a manual operating tool for manually operating the holding section to the holding state. Further included are a brake linkage section that operates the holding section to the release state when the brake pedal is depressed in the holding state, and an output linkage section that operates the holding section to the release state when the output pedal is depressed in the holding state.

8 Claims, 7 Drawing Sheets

Fig.9

WORK VEHICLE

CROSS REFERENCE TO RELATED APPLICATION

This application claims priority to Japanese Patent Application No. 2022-064614 filed on Apr. 8, 2022, the disclosure of which is hereby incorporated by reference in its entirety.

BACKGROUND OF THE INVENTION

1. Field of the Invention

The present invention relates to the configuration of a transmission operation system in a work vehicle.

2. Description of the Related Art

There are work vehicles in which the motive power of the engine (corresponds to motive section) is transmitted to front wheels and rear wheels via a belt-type stepless transmission, as disclosed in Patent Document 1 (JP 2012-51507A).

In Patent Document 1, the driver controls the output of the engine by depressing an accelerator pedal (corresponds to output pedal) that operates an accelerator section of the engine. The stepless transmission is operated to increase speed in response to the accelerator pedal being depressed and the engine revolutions increasing, and the stepless transmission is operated to reduce speed in response to the accelerator pedal being returned and the engine revolutions decreasing.

In the case of a work vehicle that sprays herbicides, snow melting agent or the like, for example, the work vehicle needs to travel at a constant speed.

In this case, with the work vehicle of Patent Document 1, the driver is required to keep the accelerator pedal depressed such that the work vehicle is maintained at a desired speed, thus leaving room for improvement.

SUMMARY OF THE INVENTION

An object of the present invention is to enable a work vehicle in which an output pedal is used to control the output of a motive section such as an engine or an electric motor to easily maintain a desired travel speed.

A work vehicle of the present invention includes an output pedal configured to control an output of a motive section, a biasing member configured to bias the output pedal to return, a brake pedal configured to operate a travel brake to a braking state, a holding section operable to a holding state of holding the output pedal at any depressed position and to a release state of releasing the holding of the output pedal, a manual operating tool for manually operating the holding section to the holding state, a brake linkage section configured to operate the holding section to the release state in response to the brake pedal being depressed in the holding state, and an output linkage section configured to operate the holding section to the release state in response to the output pedal being depressed in the holding state.

According to the present invention, the output (rotational speed) of the motive section increases due to the driver depressing the output pedal, and the output (rotational speed) of the motive section decreases due to the output pedal being returned by the biasing member in response to the driver taking his or her foot off the output pedal.

The driver depresses the output pedal and when a desired travel speed is reached, the driver operates the holding section to a holding state by operating the manual operating tool to hold the output pedal. Because the output pedal is held at the desired position, even if the driver takes his or her foot off the output pedal, the work vehicle is maintained at the desired travel speed.

The work vehicle can thereby be easily maintained at the desired travel speed, enabling the operability of the transmission operation system of the work vehicle to be improved.

According to the present invention, in response to the driver depressing the brake pedal when the work vehicle is traveling with the output pedal held at the desired position, the holding section is released by the brake linkage section, and the output (revolutions) of the motive section decreases due to the output pedal being returned by the biasing member.

The travel speed of the work vehicle can thereby be easily reduced (the work vehicle can be easily stopped), while maintaining the increased output (rotational speed) of the motive section, without needing to forcibly reduce the travel speed of the work vehicle (without needing to forcibly stop the work vehicle).

According to the present invention, in response to the driver depressing the output pedal when the work vehicle is traveling with the output pedal held at the desired position, the holding section is released by the output linkage section, and the output pedal can be depressed (the output (revolutions) of the motive section can be increased), without interference from the holding section.

As described above, the operability of the transmission operation system of the work vehicle can be improved when the work vehicle is traveling with the output pedal held at the desired position, due to the holding section being released by the brake pedal being depressed, and due to the holding section being released by the output pedal being depressed.

In the present invention, it is preferable that the manual operating tool is located higher than the output pedal, the output linkage section includes an operating member disposed above the output pedal at a height between the manual operating tool and the output pedal, and linked to the output pedal so as to operate in conjunction with the output pedal being depressed and then being returned, and the holding section enters the holding state due to being engaged with the operating member and holding the operating member, and enters the release state due to being separated from the operating member.

According to the present invention, the manual operating tool is easy for the driver to operate due to being located higher than the output pedal, thus enabling the operability of the manual operating tool to be improved.

In the case where the output pedal is configured to be held at a desired position, the output pedal is preferably not held by the holding section directly acting on the output section, due to the driver's foot being near the output pedal.

According to the present invention, the output linkage section includes an operating member that operates in conjunction with the output pedal being depressed and then being returned disposed above the output pedal at a height between the manual operating tool and the output pedal, and the holding section acts on the operating member.

Because the holding section and the operating member are thereby disposed away from the driver's foot, interference between the driver's foot and the holding section and operating member is unlikely.

According to the present invention, the output pedal and the operating member are not further away from each other than necessary, due to the operating member being disposed above the output pedal rather being spaced away from the output pedal in the left-right direction, and due to the operating member being located lower than the manual operating tool.

In the present invention, it is preferable that the manual operating tool is spaced away from the output pedal in the left-right direction, and the work vehicle further includes a linkage member connected to the manual operating tool and the holding section, and configured to transmit operation of the manual operating tool to the holding section such that the holding section is operated to the holding state.

In a work vehicle, the operating switch of an air conditioner or the like could conceivably be disposed above the output pedal.

According to the present invention, the manual operating tool, when located higher than the output pedal, is spaced away from the output pedal in the left-right direction, and the linkage member is connected to the manual operating tool and the holding section. The manual operating tool can thereby be easily provided, while avoiding the operating switch of an air conditioner or the like.

In the present invention, it is preferable that the brake linkage section is configured such that the holding section is separated from the operating member by the brake pedal in response to the brake pedal being depressed in the holding state.

According to the present invention, in response to the driver depressing the brake pedal when the work vehicle is traveling with the output pedal held at the desired position, the brake pedal acts directly on the holding section in the brake linkage section and separates the holding section from the operating member.

Because the force of the driver's foot thereby acts directly on the holding section via the brake pedal, the holding section is released without delay when the brake pedal is depressed.

In the present invention, it is preferable that the work vehicle further includes a support member configured to support the output pedal in such a manner that the output pedal is depressable and returnable, and the biasing member is connected to the output pedal and the support member.

According to the present invention, a biasing member that biases the output pedal to return is connected to the output pedal and a support member that supports the output pedal. The support member that supports the output pedal is thereby also used as an attachment member of the biasing member, and is thus advantageous in terms of simplifying the structure.

In the present invention, it is preferable that the work vehicle includes an upper link supported by the support member in such a manner as to be swingable up and down, and extending rearward from the support member, and a lower link supported by the support member in such a manner as to be swingable up and down, and extending rearward from the support member, and the output pedal is connected to a rear section of the upper link and a rear section of the lower link.

According to the present invention, due to the output pedal being supported by the support member via the upper link and the lower link, the output pedal moves more parallelly up and down than with a configuration in which the output pedal is supported in such a manner as to be swingable up and down about an axis along the left-right direction.

The output pedal is thereby easier for the driver to depress in a work vehicle in which the driver is seated in a relatively upright posture compared to a general passenger car.

In the present invention, it is preferable that the operating member is supported in such a manner as to swing in a first direction about a first axis in conjunction with the output pedal being depressed, and to swing in a second direction opposite to the first direction about the first axis in conjunction with the output pedal being returned, the operating member includes a plurality of first receiving sections along a radial direction of the first axis, and a plurality of first inclined sections facing in both the first direction and a direction approaching the first axis, from an outer edge section of the first receiving sections in the radial direction of the first axis, the holding section is supported in such a manner as to be swingable about a second axis parallel to the first axis, the holding section includes a second receiving section along a radial direction of the second axis, and a second inclined section facing in both the second direction and a direction approaching the second axis, from an outer edge section of the second receiving section in the radial direction of the second axis, the holding section enters the holding state as a result of being engaged with the operating member and to bring one of the first receiving sections into contact with the second receiving section so that the return of the output pedal by the biasing member is stopped and that the operating member is held, and in response to the output pedal in the holding state being depressed, the holding section enters the release state as a result of the swing of the operating member in the first direction pressing one of the first inclined sections against the second inclined section so that the holding section is separated from the operating member.

According to the present invention, the operating member of the output linkage section has a plurality of first receiving sections and a plurality of first inclined sections. The holding section has a second receiving section substantially parallel to the first receiving sections and a second inclined section inclined in the opposite direction to the first inclined sections.

When the holding section is engaged with the operating member by the manual operating tool, the second receiving section of the holding section comes into contact with one of the first receiving sections of the operating member. In this case, because the biasing member biases the operating member in the second direction, the output pedal (operating member) is held, due to the first receiving section of the operating member being pressed against and stopped by the second receiving section of the holding section. This achieves the holding state.

The holding state is released by depressing the brake pedal, due to the second receiving section of the holding section being separated from the first receiving section of the operating member.

In response to the output pedal being depressed in the aforementioned holding state, the operating member is swung in the first direction, and one of the first inclined sections of the operating member is pressed against the second inclined section of the holding section.

In this case, when one of the first inclined sections of the operating member is pressed against the second inclined section of the holding section, a component force that pushes the holding section away from the operating member is produced, due to the first inclined section of the operating member being inclined to face in the first direction, and the second inclined section of the holding member being inclined to face in the second direction opposite to the first direction, and the second receiving section of the holding section is separated from the first receiving section of the operating member, thereby releasing the holding state.

As described above, by devising the shapes of the first receiving sections and the first inclined sections of the operating member of the output linkage section and the shapes of the second receiving section and the second inclined section of the holding section, an output linkage section that releases the holding section in response to the output pedal being depressed in the holding state can be obtained with a simple structure.

BRIEF DESCRIPTION OF THE DRAWINGS

FIG. 9 is a left side view of the vicinity of the brake pedal in the release state in which the holding section is separated from the operating member due to the brake pedal being depressed in the state shown in FIG. 8.

DESCRIPTION OF THE INVENTION

A multipurpose work vehicle is shown in FIGS. 1 to 9. In FIGS. 1 to 9, F indicates front, B indicates back, U indicates up, D indicates down, R indicates right, and L indicates left.

Overall Configuration of Work Vehicle

Figure 1:
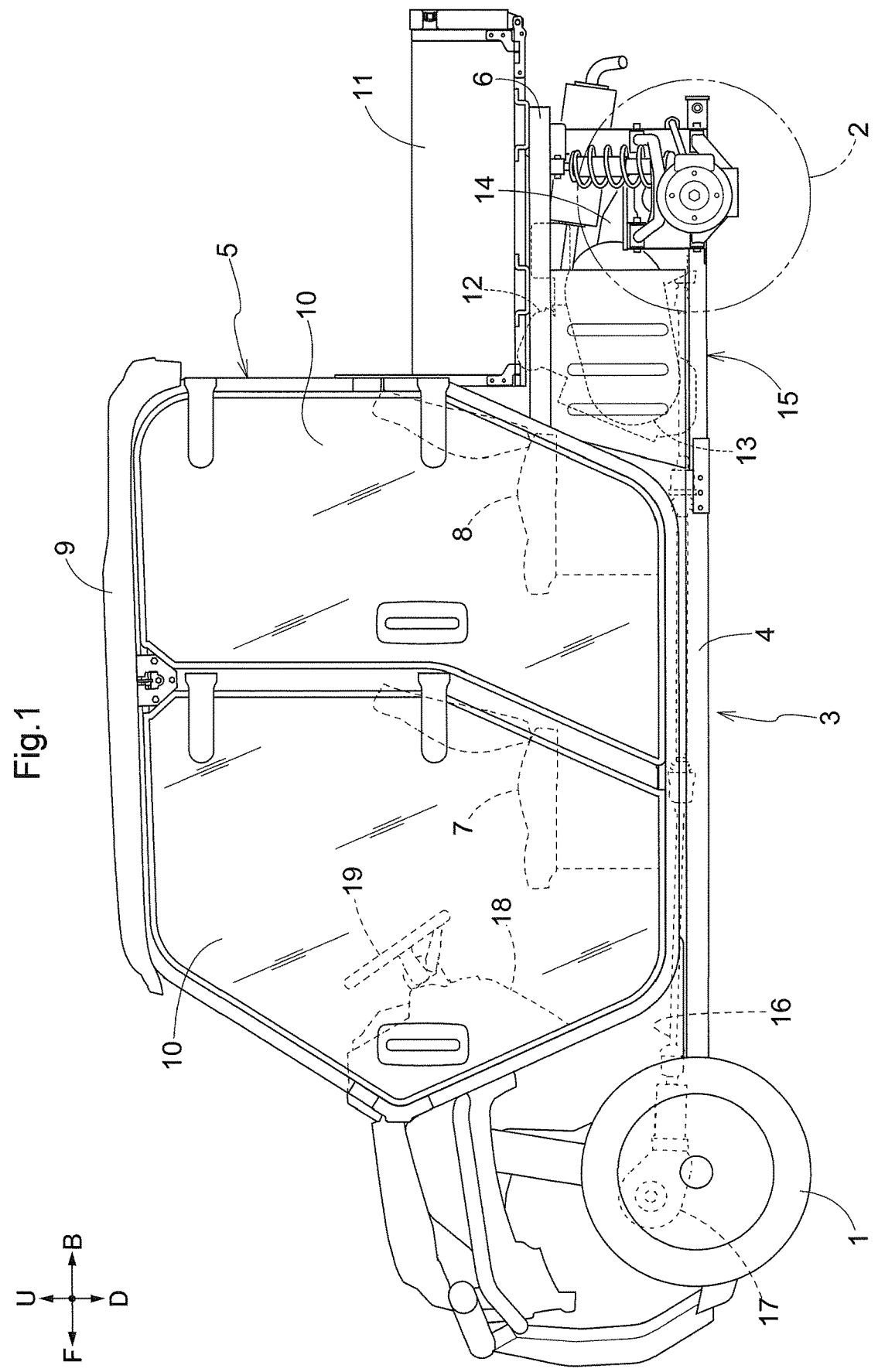
FIG. 1 is a left side view of a work vehicle.

As shown in FIG. 1, the work vehicle includes a body frame 3 that is supported by right and left front wheels 1 and right and left rear wheels 2. The body frame 3 includes a floor frame 4, a ROPS frame 5 and a rear frame 6. The rear frame 6 is connected to a rear section of the ROPS frame 5 and extends rearward, and a cargo bed 11 is supported by the rear frame 6.

The floor frame 4 is provided with right and left front seats 7 and right and left rear seats 8, and the ROPS frame 5 is connected to the floor frame 4 so as to cover the front seats 7 and the rear seats 8. The ROPS frame 5 is provided with a windshield (not shown) and a rear glass (not shown) in front and rear sections thereof, respectively, a roof 9 on an upper section thereof, and doors 10 in front and rear sections thereof.

The floor frame 4 and the rear frame 6 have a lower frame 15 connected thereto, and the lower frame 15 supports an engine 12 (corresponds to motive section), a stepless transmission 13, a mission case 14, and the rear wheels 2.

The stepless transmission 13 is a belt-type stepless transmission. The stepless transmission 13 is automatically operated to increase speed in response to the revolutions of the engine 12 increasing, and is automatically operated to reduce speed in response to the revolutions of the engine 12 decreasing.

The mission case 14 houses a sub-transmission (not shown) with three forward speeds one reverse speed and a rear wheel differential (not shown).

The power of the engine 12 is transmitted to the stepless transmission 13 and shifted, is transmitted to the sub-transmission of the mission case 14 and shifted, is transmitted to the rear wheel differential, and is transmitted from the rear wheel differential to the rear wheels 2. Power branched from between the sub-transmission and the rear wheel differential is transmitted to a front wheel differential 17 via a transmission shaft 16, and from the front wheel differential 17 to the front wheels 1.

Configuration in Vicinity of Front Section Inside ROPS Frame

Figure 2:
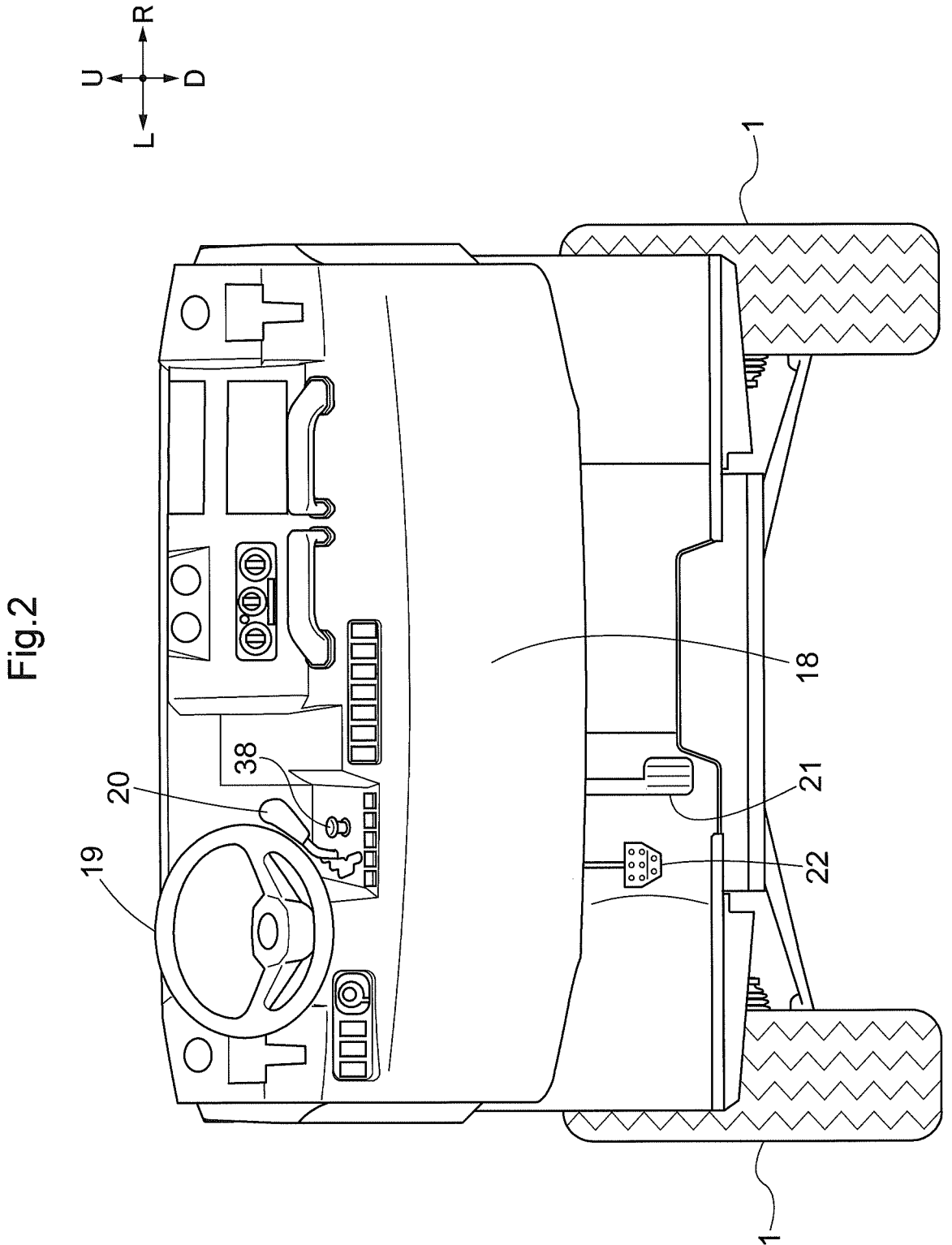
FIG. 2 is a rear view of the vicinity of a front panel.

As shown in FIGS. 1 and 2, the work vehicle includes a front panel 18 provided inside the ROPS frame 5 at a position forward of the front seat 7.

The front panel 18 is provided with a steering wheel 19 for steering the front wheels 1 and a transmission lever 20 for operating the sub-transmission of the mission case 14 on an upper left section thereof (forward of left front seat 7). The work vehicle further includes an accelerator pedal 21 (corresponds to output pedal) and a brake pedal 22 that are provided below the left section of the front panel 18 (forward of left front seat 7).

Support Structure of Accelerator Pedal

Figure 3:
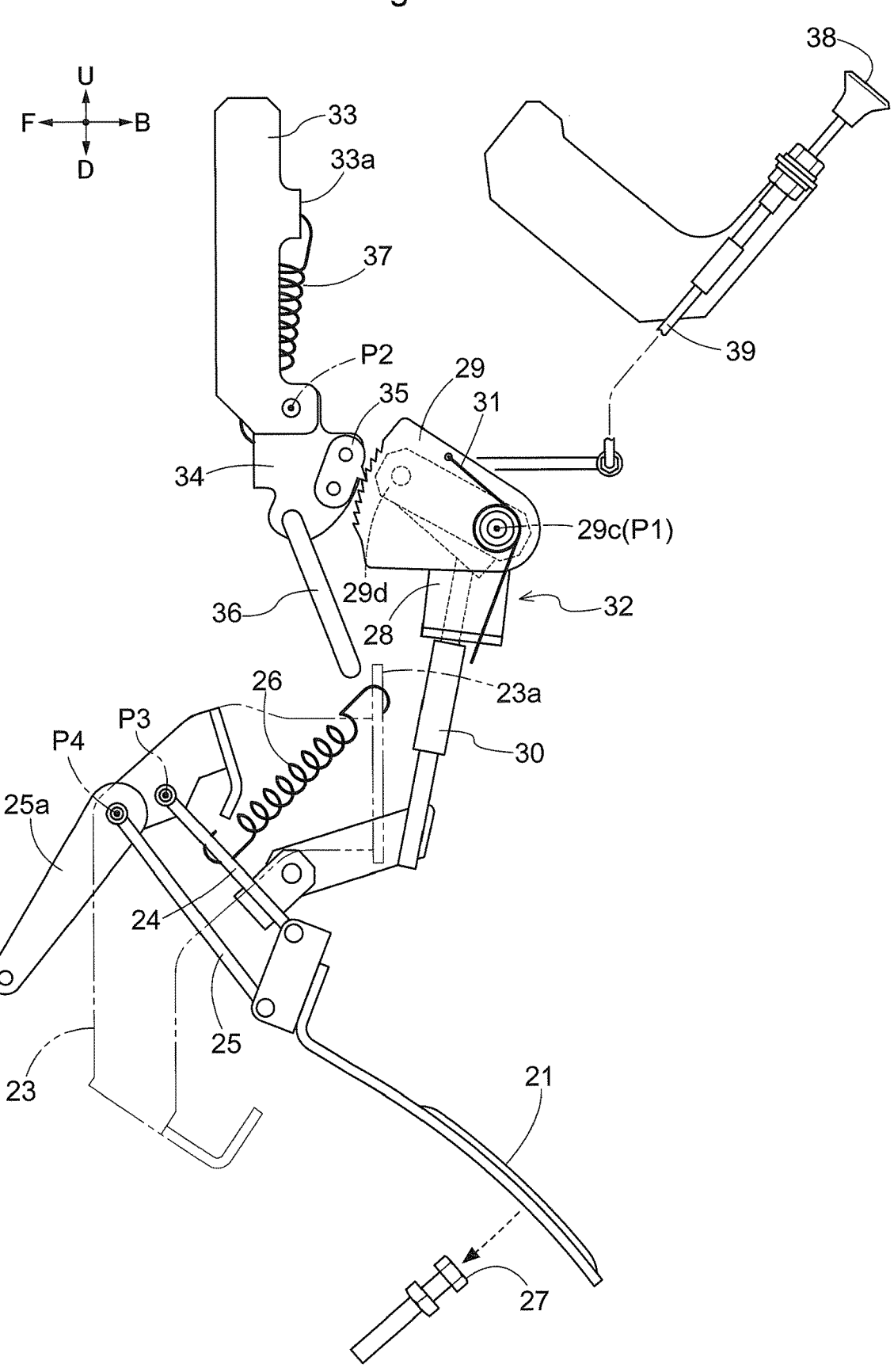
FIG. 3 is a left side view of the vicinity of an accelerator pedal.
Figure 4:
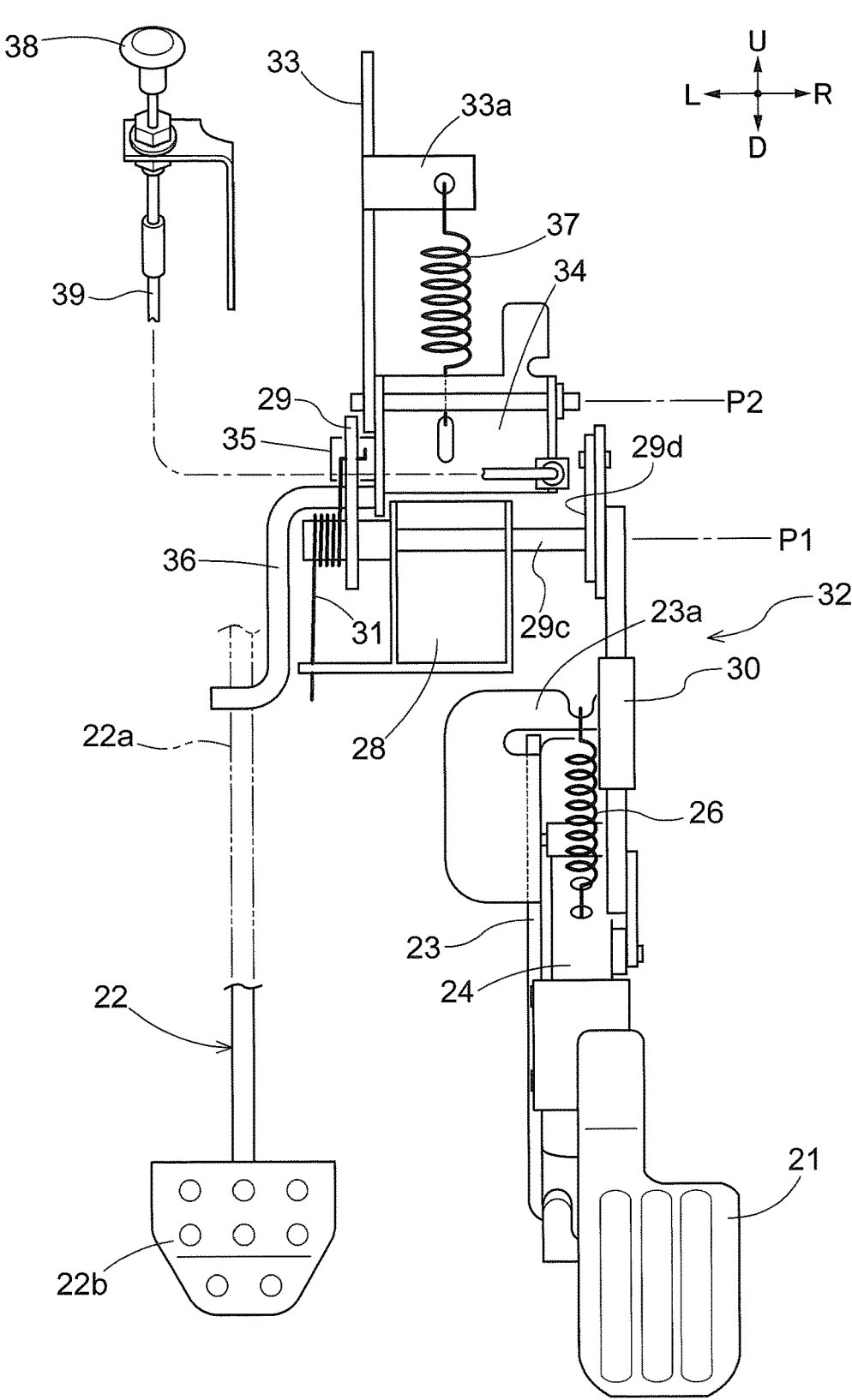
FIG. 4 is a rear view of the vicinity of the accelerator pedal.

As shown in FIGS. 3 and 4, the work vehicle includes a support member 23 that is provided inside the front panel 18 (see FIG. 2). The support member 23 supports a tabular upper link 24 in such a manner that the tabular upper link 24 is swingable up and down about an axis P3 along the left-right direction, with the upper link 24 extending rearward from the support member 23. The support member 23 also supports a tabular lower link 25 in such a manner that the tabular lower link 25 is swingable up and down about an axis P4 along the left-right direction, with the lower link 25 extending rearward from the support member 23.

The accelerator pedal 21 is connected to a rear section of the upper link 24 and a rear section of the lower link 25, and an arm 25a connected to a front section of the lower link 25 and a potentiometer-type position sensor (not shown) are connected via a linkage rod (not shown).

The support structure of the accelerator pedal 21 includes a spring 26 (corresponds to biasing member) that is connected to an attachment section 23a on an upper section of the support member 23 and the upper link 24, and the accelerator pedal 21 is biased to return (move upward) by the spring 26. The support structure also includes a stopper 27 for setting a limit to how much the accelerator pedal 21 can be depressed that is provided below the accelerator pedal 21.

With the above configuration, the accelerator pedal 21 is supported by the support member 23 in such a manner that the output pedal is depressable and returnable. The spring 26 (biasing member) that biases the accelerator pedal 21 to return is connected to the accelerator pedal 21 and the support member 23 via the upper link 24.

The operation position of the accelerator pedal 21 is detected by the position sensor via the lower link 25, and the output of the engine 12 is controlled (fly-by-wire) due to an accelerator section of the engine 12 being operated by an actuator (not shown), based on the detection value of the position sensor. In this case, a wire (not shown) may be connected to the accelerator pedal 21 (arm 25*a* of lower link 25) and the accelerator section of the engine 12.

Configuration of Output Linkage Section

As shown in FIGS. 3 and 4, the configuration of an output linkage section 32 includes a support member 28 provided above the support member 23, and a tabular operating member 29 having a fulcrum shaft 29*c* that is supported by the support member 28 in such a manner as to be rotatable about an axis P1 (corresponds to first axis) along the left-right direction connected thereto. The operating member 29 is thereby supported by the support member 28 in such a manner as to be swingable about the axis P1, and extends forward from the axis P1.

The operating member 29 includes an arm 29*d* that is connected to an end section of the fulcrum shaft 29*c*, and a linkage rod 30 is connected to the arm 29*d* of the operating member 29 and the upper link 24. The fulcrum shaft 29*c* of the operating member 29 has a spring 31 that biases the operating member 29 in the clockwise direction in FIG. 3 attached thereto. The support member 28, the operating member 29, the linkage rod 30 and the spring 31 thereby constitute the output linkage section 32.

Figure 5:
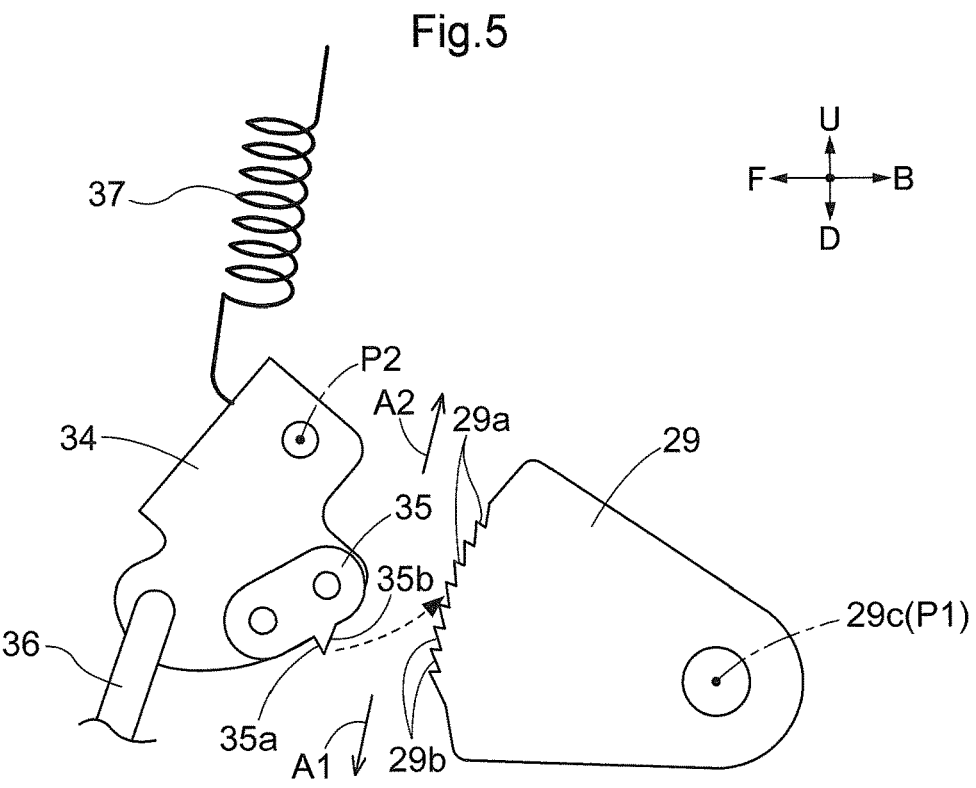
FIG. 5 is a left side view of the vicinity of an operating member and a holding section.

As shown in FIG. 5, the operating member 29 has a front end section formed in a sawtooth shape, and the front end section of the operating member 29 is provided with a plurality of first receiving sections 29*a* along the radial direction of the axis P1. The front end section of the operating member 29 is also provided with a plurality of first inclined sections 29*b* that are inclined to face in both a first direction A1 and a direction approaching the axis P1, from an outer edge section of the first receiving sections 29*a* in the radial direction of the axis P1.

According to the above configuration, as shown in FIGS. 3, 4 and 5, in response to the accelerator pedal 21 being depressed (operated downward), the linkage rod 30 is operated downward by the upper link 24 in conjunction with the accelerator pedal 21 being depressed, and the operating member 29 is swung in the first direction A1 (counterclockwise direction in FIG. 5) about the axis P1, by the fulcrum shaft 29*c* and arm 29*d* of the operating member 29.

In response to the accelerator pedal 21 being returned by the spring 26 (being operated upward), the linkage rod 30 is operated upward by the upper link 24 in conjunction with the accelerator pedal 21 being returned, and the operating member 29 is swung in a second direction A2 (clockwise direction in FIG. 5) opposite to the first direction A1 about the axis P1, by the fulcrum shaft 29*c* and arm 29*d* of the operating member 29 and the spring 31.

Configuration of Holding Section

As shown in FIGS. 3 and 4, the work vehicle includes a support member 33 that is provided above the support member 23. The support member 33 supports a holding section 34 in such a manner that the holding section 34 is swingable about an axis P2 (corresponds to second axis) along the left-right direction parallel to the axis P1.

The holding section 34 is formed by bending a plate into a channel shape, and has an engaging section 35 and a linkage arm 36 (corresponds to brake linkage section) connected thereto. The support member 33 has an attachment section 33*a*, and between the attachment section 33*a* and the holding section 34 is attached a spring 37, with the holding section 34 being biased in the clockwise direction in FIG. 3 by the spring 37.

As shown in FIG. 5, the engaging section 35 is provided with a second receiving section 35*a* and a second inclined section 35*b*. The second receiving section 35*a* is formed along the radial direction of the axis P2. The second inclined section 35*b* is inclined to face in both the second direction A2 and a direction approaching the axis P2, from an outer edge section of the second receiving section 35*a* in the radial direction of the axis P2.

As shown in FIGS. 2, 3 and 4, the front panel 18 is provided with an operating knob 38 (corresponds to manual operating tool) on a section adjacent to the transmission lever 20, and between the operating knob 38 and the holding section 34 is connected a wire 39 (corresponds to linkage member).

In response to the operating knob 38 being pulled upward and rearward, the operation of the operating knob 38 is transmitted to the holding section 34 via the wire 39, and the holding section 34 swings in the counterclockwise direction in FIGS. 3 and 5 about the axis P2, and is engaged with the operating member 29 (holding state).

According to the above configuration, the operating knob 38 (manual operating tool) for manually operating the holding section 34 to the holding state is provided. The operating knob 38 (manual operating tool) is located higher (front panel 18) than the accelerator pedal 21 (output pedal), and is spaced away from the accelerator pedal 21 (output pedal) in the left-right direction (see FIG. 2).

In the output linkage section 32, the operating member 29 linked to the accelerator pedal 21 (output pedal) is disposed above e accelerator pedal 21 (output pedal) at a height between the operating knob 38 (manual operating tool) and the accelerator pedal 21 (output pedal), and the operating member 29 operates in conjunction with the accelerator pedal 21 (output pedal) being depressed and then being returned.

Holding State of Accelerator Pedal

To maintain the work vehicle at a desired travel speed, the driver need only perform operations such as described below.

As shown in FIG. 5, when operated to the release state in which the holding section 34 (engaging section 35) is separated from the operating member 29, the operating member 29 is swung about the axis P1, due to the driver depressing and returning the accelerator pedal 21, and the output (revolutions) of the engine 12 is controlled.

Figure 6:
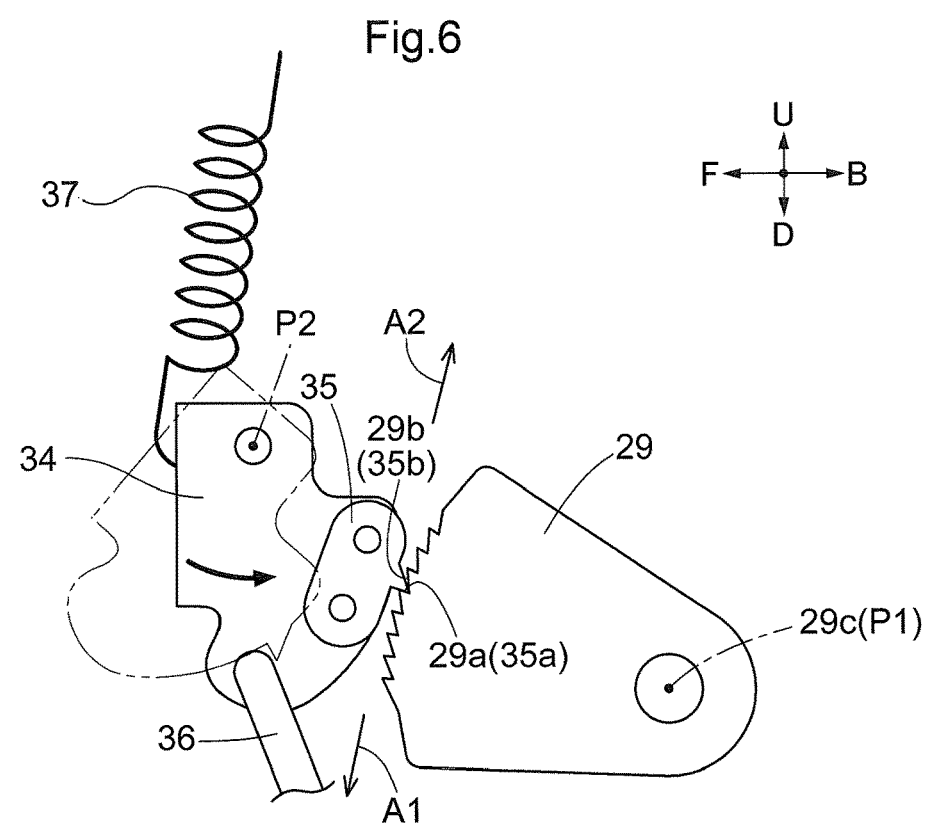
FIG. 6 is a left side view of the vicinity of the operating member and the holding section in a holding state in which the holding section is engaged with the operating member.

As shown in FIGS. 5 to 3 and 6, the driver depresses the accelerator pedal 21 and when a desired travel speed is reached, the driver pulls the operating knob 38 while continuing to depress the accelerator pedal 21, and causes the holding section 34 (engaging section 35) to swing in the counterclockwise direction in FIG. 6 about the axis P2, and engage with the operating member 29.

As shown in FIG. 6, in response to the holding section 34 (engaging section 35) being engaged with the operating member 29, the second receiving section 35*a* of the holding section 34 (engaging section 35) comes into contact with one of the first receiving sections 29*a* of the operating member 29. In this case, because the operating member 29 is biased in the second direction A2 by the springs 26 and 31 (see FIGS. 3 and 4), the first receiving section 29*a* of the operating member 29 is pressed against the second receiving section 35*a* of the holding section 34 (engaging section 35).

The frictional resistance between the first receiving section 29*a* of the operating member 29 and the second receiving section 35*a* of the holding section 34 (engaging section 35) is stronger than the biasing force of the spring 37. The operating member 29 is thereby held by the holding section 34 (engaging section 35), without the holding section 34 (engaging section 35) being separated from the operating member 29 by the spring 37, and the accelerator pedal 21 is held due to returning of the accelerator pedal 21 by the springs 26 and 31 being stopped. This is the holding state.

Because the accelerator pedal 21 is held at a desired depressed position (holding state), even if the driver takes his or her foot off the accelerator pedal 21, the work vehicle is maintained at the desired travel speed.

According to the above configuration, by pulling the operating knob 38 to engage the holding section 34 (engaging section 35) with the operating member 29, with the accelerator pedal 21 depressed at any position, the driver is able to hold the accelerator pedal 21 at that depressed position (holding state).

Operation to Release of Accelerator Pedal by Depressing Brake Pedal

Figures 7, 8:
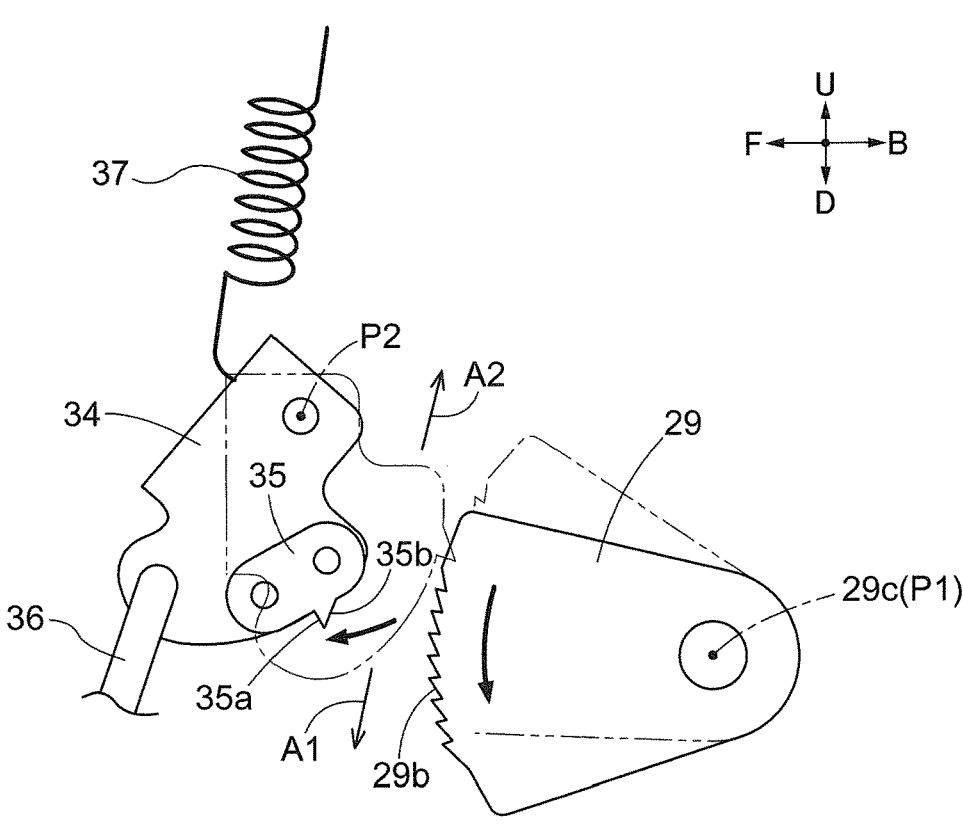
FIG. 7 is a left side view of the vicinity of the operating member and the holding section in the release state in which the holding section is separated from the operating member due to the accelerator pedal being depressed in the state shown in FIG. 6.
FIG. 8 is a left side view of the vicinity of a brake pedal in the holding state in which the holding section is engaged with the operating member.
Figure 9:
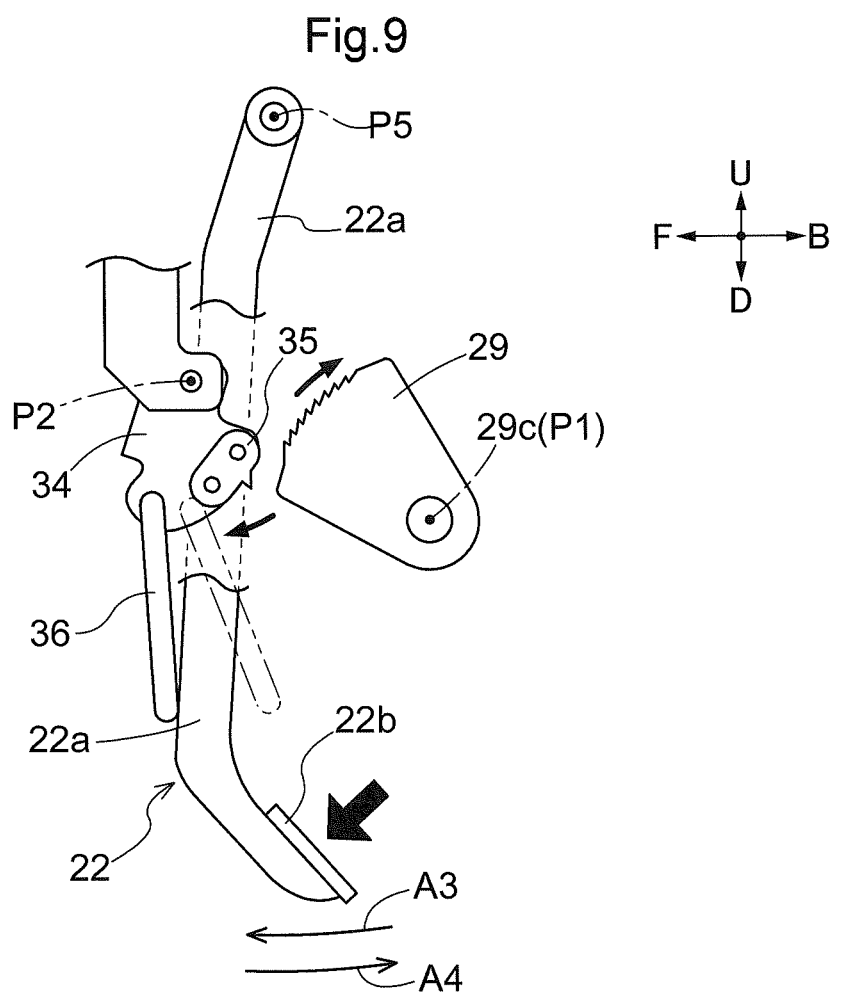

As shown in FIGS. 4, 8 and 9, the brake pedal 22 is provided below the left section of the front panel 18 (see FIG. 2). The brake pedal 22 has an arm 22a supported in such a manner as to be swingable about an axis P5 along the left-right direction, and a depressing section 22b provided below a lower section of the arm 22a.

In response to the depressing section 22b of the brake pedal 22 being depressed and the brake pedal 22 being operated in a depressing direction A3 about the axis P5, a travel brake (not shown) is operated to a braking state. The brake pedal 22 is biased in a return direction A4 by a spring (not shown).

The arm 22a of the brake pedal 22 is provided forward of the linkage arm 36. As shown in FIG. 8, the linkage arm 36 is located in a vicinity forward of the arm 22a of the brake pedal 22, in the holding state in which the holding section 34 (engaging section 35) is engaged with the operating member 29.

When, in the holding state in which the holding section 34 (engaging section 35) is engaged with the operating member 29, the depressing section 22b of the brake pedal 22 is depressed and the brake is operated to the braking state (depressing direction A3), as shown in FIG. 9, the arm 22a of the brake pedal 22 comes into contact with the linkage arm 36 and pushes the linkage arm 36 forward, and the holding section 34 (engaging section 35) is moved forward away from the operating member 29 about the axis P2, and releases the holding state.

Due to transitioning to the release state in which the holding section 34 (engaging section 35) is separated from the operating member 29, the accelerator pedal 21 is returned by the springs 26 and 31 (see FIGS. 3 and 4), and the output (rotational speed) of the engine 12 decreases.

Thereafter, even if the brake pedal 22 is returned (return direction A4), the holding section 34 (engaging section 35) is maintained in the release state separated from the operating member 29 by the spring 37 (see FIGS. 3 to 6).

In the release state in which the holding section 34 (engaging section 35) is separated from the operating member 29, there is no interference between the brake pedal 22 (arm 22a) and the linkage arm 36, even if the brake pedal 22 is depressed (depressing direction A3) and then returned (return direction A4).

According to the above configuration, in response to the brake pedal 22 being depressed in the holding state in which the holding section 34 (engaging section 35) is engaged with the operating member 29, the holding section 34 (engaging section 35) is operated to the release state by the linkage arm 36 (brake linkage section).

Due to being operated to the release state in which the holding section 34 (engaging section 35) is separated from the operating member 29, holding of the accelerator pedal 21 (output pedal) is released, and the driver is able to depress and to return the accelerator pedal 21, allowing the output (revolutions) of the engine 12 to be controlled due to the operating member 29 being swung about the axis P1.

Operation to Release State of Accelerator Pedal by Depressing Accelerator Pedal

As shown in FIG. 6, in the holding state in which the holding section 34 (engaging section 35) is engaged with the operating member 29, the second receiving section 35a of the holding section 34 (engaging section 35) comes into contact with one of the first receiving sections 29a of the operating member 29, and the first receiving section 29a of the operating member 29 is pressed against the second receiving section 35a of the holding section 34 (engaging section 35), due to the operating member 29 being biased in the second direction A2 by the springs 26 and 31 (see FIGS. 3 and 4).

In response to the accelerator pedal 21 being depressed in the aforementioned state, the operating member 29 is swung in the first direction A1 about the axis P1 in conjunction with the accelerator pedal 21 being depressed. Consequently, the first inclined section 29b of the operating member 29 that is adjacent to the second inclined section 35b of the holding section 34 (engaging section 35), among the first inclined sections 29b of the operating member 29, is pressed in the first direction A1 against the second inclined section 35b of the holding section 34 (engaging section 35).

In this case, the first inclined section 29b of the operating member 29 is inclined to face in the first direction A1, and the second inclined section 35b of the holding section 34 (engaging section 35) is inclined to face in the second direction A2 opposite to the first direction A1.

As shown in FIG. 7, when the first inclined section 29b of the operating member 29 is pressed in the first direction A1 against the second inclined section 35b of the holding section 34 (engaging section 35), a component force that pushes the holding section 34 (engaging section 35) away (forward) from the operating member 29 is produced, and the second receiving section 35a of the holding section 34 (engaging section 35) is separated from the first receiving section 29a of the operating member 29.

In response to the second receiving section 35a of the holding section 34 (engaging section 35) being separated from the first receiving section 29a of the operating member 29, the holding section 34 (engaging section 35) is swung further forward about the axis P2 by the spring 37, and the holding section 34 (engaging section 35) is separated from the operating member 29. This achieves the release state.

Even if depressing the accelerator pedal 21 is stopped, the holding section 34 (engaging section 35) is maintained in the release state separated from the operating member 29 by the spring 37.

According to the above configuration, in response to the accelerator pedal 21 being depressed in the holding state in which the holding section 34 (engaging section 35) is engaged with the operating member 29, the holding section 34 (engaging section 35) is operated to the release state by the operating member 29 (output linkage section 32).

Due to being operated to the release state in which the holding section 34 (engaging section 35) is separated from the operating member 29, holding of the accelerator pedal 21 (output pedal) is released, and the driver is able to depress and to return the accelerator pedal 21, allowing the output (revolutions) of the engine 12 to be controlled due to the operating member 29 being swung about the axis P1.

First Alternative Embodiment of Invention

The wire 39 may be eliminated, and a linkage rod (not shown) (corresponds to linkage member) or a linkage link (not shown) (corresponds to linkage member) may be connected to the operating knob 38 and the holding section 34 (engaging section 35).

According to the aforementioned configuration, pushing of the operating knob 38 forward and downward can be transmitted to the holding section 34 (engaging section 35), thus enabling the holding section 34 (engaging section 35) to be operated to the holding state engaged with the operating member 29 and to the release state separated from the operating member 29, due to the operating knob 38 being pulled and pushed.

In this case, an operating lever (not shown) (corresponds to manual operating tool) may be employed, instead of the operating knob 38.

Second Alternative Embodiment of Invention

An electric motor (not shown) may be provided as the motive section, instead of the engine 12.

According to this configuration, the configuration shown in FIGS. 3 to 9 need only be employed for an output pedal (not shown) that controls the output of the electric motor.

The present invention can be applied to a work vehicle that controls the output of a motive section such as an engine or an electric motor with an output pedal.

DESCRIPTION OF REFERENCE SIGNS

12 Engine (motive section)
21 Accelerator pedal (output pedal)
22 Brake pedal
23 Support member
24 Upper link
25 Lower link
26 Spring (biasing member)
29 Operating member
29*a* First receiving section
29*b* First inclined section
32 Output linkage section
34 Holding section
35A Second receiving section
35*b* Second inclined section
36 Linkage arm (brake linkage section)
38 Operating knob (manual operating tool)
39 Wire (linkage member)
A1 First direction
A2 Second direction
P1 Axis (first axis)
P2 Axis (second axis)

The invention claimed is:

1. A work vehicle comprising:
an output pedal configured to control an output of a motive section;
a biasing member configured to bias the output pedal to return;
a brake pedal configured to operate a travel brake to a braking state;
a holding section operable to a holding state of holding the output pedal at any depressed position and to a release state of releasing the holding of the output pedal and being maintained in the release state when depressed operation of the output pedal is stopped;
a manual operating tool for manually operating the holding section to the holding state;
a brake linkage section configured to operate the holding section to the release state in response to the brake pedal being depressed in the holding state;

an output linkage section configured to operate the holding section to the release state in response to the output pedal being depressed in the holding state;
a support member configured to support the output pedal in such a manner that the output pedal is depressable and returnable,
an upper link supported by the support member in such a manner as to be swingable up and down and extending rearward from the support member; and
a lower link supported by the support member in such a manner as to be swingable up and down and extending rearward from the support member.

2. The work vehicle according to claim 1,
wherein the manual operating tool is located higher than the output pedal,
the output linkage section comprises an operating member disposed above the output pedal at a height between the manual operating tool and the output pedal, and linked to the output pedal so as to operate in conjunction with the output pedal being depressed and then being returned, and
wherein the holding section enters the holding state due to being engaged with the operating member and holding the operating member, and enters the release state due to being separated from the operating member.

3. The work vehicle according to claim 2,
wherein the manual operating tool is spaced away from the output pedal in a left-right direction, and
wherein the work vehicle further comprises a linkage member connected to the manual operating tool and the holding section and configured to transmit operation of the manual operating tool to the holding section such that the holding section is operated to the holding state.

4. The work vehicle according to claim 3,
wherein the brake linkage section is configured such that the holding section is separated from the operating member by the brake pedal in response to the brake pedal being depressed in the holding state.

5. The work vehicle according to claim 4, further comprising:
wherein the biasing member is connected to the output pedal and the support member.

6. The work vehicle according to claim 5, further comprising:
wherein the output pedal is connected to a rear section of the upper link and a rear section of the lower link.

7. A work vehicle comprising:
an output pedal configured to control an output of a motive section;
a biasing member configured to bias the output pedal to return;
a brake pedal configured to operate a travel brake to a braking state;
a holding section operable to a holding state of holding the output pedal at any depressed position and to a release state of releasing the holding of the output pedal and being maintained in the release state when depressed operation of the output pedal is stopped;
a manual operating tool for manually operating the holding section to the holding state;
a brake linkage section configured to operate the holding section to the release state in response to the brake pedal being depressed in the holding state; and
an output linkage section configured to operate the holding section to the release state in response to the output pedal being depressed in the holding state;

wherein the manual operating tool is located higher than the output pedal, wherein the output linkage section comprises an operating member disposed above the output pedal at a height between the manual operating tool and the output pedal, and linked to the output pedal so as to operate in conjunction with the output pedal being depressed and then being returned, wherein the holding section enters the holding state due to being engaged with the operating member and holding the operating member, and enters the release state due to being separated from the operating member, wherein the operating member is supported in such a manner as to swing in a first direction about a first axis in conjunction with the output pedal being depressed, and to swing in a second direction opposite to the first direction about the first axis in conjunction with the output pedal being returned, wherein the operating member comprises:

a plurality of first receiving sections along a radial direction of the first axis; and a plurality of first inclined sections facing in both the first direction and a direction approaching the first axis, from an outer edge section of the first receiving sections in the radial direction of the first axis, wherein the holding section is supported in such a manner as to be swingable about a second axis parallel to the first axis, wherein the holding section comprises:

a second receiving section along a radial direction of the second axis; and a second inclined section facing in both the second direction and a direction approaching the second axis, from an outer edge section of the second receiving section in the radial direction of the second axis, wherein the holding section enters the holding state as a result of being engaged with the operating member to bring one of the first receiving sections into contact with the second receiving section so that the return of the output pedal by the biasing member is stopped and that the operating member is held, and wherein in response to the output pedal in the holding state being depressed, the holding section enters the release state as a result of the swing of the operating member in the first direction pressing one of the first inclined sections against the second inclined section so that the holding section is separated from the operating member.

8. A work vehicle comprising:

an output pedal configured to control an output of a motive section;

a biasing member configured to bias the output pedal to return;

a brake pedal configured to operate a travel brake to a braking state;

a holding section operable to a holding state of holding the output pedal at any depressed position and to a release state of releasing the holding of the output pedal and being maintained in the release state when depressed operation of the output pedal is stopped;

a manual operating tool for manually operating the holding section to the holding state;

a brake linkage section configured to operate the holding section to the release state in response to the brake pedal being depressed in the holding state;

a support member configured to support the output pedal in such a manner that the output pedal is depressable and returnable;

an output linkage section configured to operate the holding section to the release state in response to the output pedal being depressed in the holding state;

an upper link supported by the support member in such a manner as to be swingable up and down and extending rearward from the support member; and a lower link supported by the support member in such a manner as to be swingable up and down and extending rearward from the support member, wherein the manual operating tool is located higher than the output pedal, wherein the output linkage section comprises an operating member disposed above the output pedal at a height between the manual operating tool and the output pedal, and linked to the output pedal so as to operate in conjunction with the output pedal being depressed and then being returned, wherein the holding section enters the holding state due to being engaged with the operating member and holding the operating member, and enters the release state due to being separated from the operating member, wherein the manual operating tool is spaced away from the output pedal in a left-right direction, wherein the work vehicle further comprises a linkage member connected to the manual operating tool and the holding section and configured to transmit operation of the manual operating tool to the holding section such that the holding section is operated to the holding state, wherein the brake linkage section is configured such that the holding section is separated from the operating member by the brake pedal in response to the brake pedal being depressed in the holding state, wherein the biasing member is connected to the output pedal and the support member, and wherein the output pedal is connected to a rear section of the upper link and a rear section of the lower link.

* * * * *